(12) United States Patent
Wallander et al.

(10) Patent No.: US 9,639,210 B2
(45) Date of Patent: May 2, 2017

(54) TOUCH DETERMINATION WITH INTERACTION COMPENSATION

(71) Applicant: FlatFrog Laboratories AB, Lund (SE)

(72) Inventors: Mats Petter Wallander, Lund (SE); Peter Juhlin, Lund (SE); Mattias Krus, Lund (SE)

(73) Assignee: FLATFROG LABORATORIES AB, Lund (SE)

( * ) Notice: Subject to any disclaimer, the term of this patent is extended or adjusted under 35 U.S.C. 154(b) by 17 days.

(21) Appl. No.: 14/367,553

(22) PCT Filed: Dec. 18, 2012

(86) PCT No.: PCT/SE2012/051419
§ 371 (c)(1),
(2) Date: Jun. 20, 2014

(87) PCT Pub. No.: WO2013/095271
PCT Pub. Date: Jun. 27, 2013

(65) Prior Publication Data
US 2014/0347325 A1    Nov. 27, 2014

Related U.S. Application Data

(60) Provisional application No. 61/579,291, filed on Dec. 22, 2011.

(30) Foreign Application Priority Data

Dec. 22, 2011   (SE) ........................................ 1151261

(51) Int. Cl.
*G06F 3/042*   (2006.01)
*G06F 3/041*   (2006.01)

(52) U.S. Cl.
CPC .......... *G06F 3/0421* (2013.01); *G06F 3/0412* (2013.01); *G06F 3/0418* (2013.01); *G06F 2203/04109* (2013.01)

(58) Field of Classification Search
CPC ...... G06F 3/042; G06F 3/0421; G06F 3/0412; G06F 3/0418; G06F 2203/04109; G01J 1/42
See application file for complete search history.

(56) References Cited

U.S. PATENT DOCUMENTS

| | | |
|---|---|---|
| 6,972,753 B1 | 12/2005 | Kimura et al. |
| 7,432,893 B2 | 10/2008 | Ma et al. |

(Continued)

FOREIGN PATENT DOCUMENTS

| | | |
|---|---|---|
| DE | 102010000473 A1 | 8/2010 |
| EP | 2314203 A1 | 4/2011 |

(Continued)

OTHER PUBLICATIONS

Tedaldi, Matthew et al. "Refractive index mapping of layered samples using optical coherence refractometry." *Proceedings of SPIE*, vol. 7171, Feb. 12, 2009 (pp. 71710V-1).

(Continued)

*Primary Examiner* — Lun-Yi Lao
*Assistant Examiner* — Johny Lau
(74) *Attorney, Agent, or Firm* — Harness, Dickey & Pierce, PLC

(57) ABSTRACT

A device implements a data processing method for an optical FTIR-based touch system. The touch system defines detection lines across a surface portion of a panel by propagating light inside the panel from a plurality of incoupling points to a plurality of outcoupling points, such that each location on the surface portion is illuminated by incident light rays. At least one light detector is coupled to the outcoupling points (Continued)

to generate an output signal. The device obtains signal values for the detection lines from the output signal and processes the signal values to at least partly compensate for variations in the apparent interaction among the subset of detection lines that interact with an object on the surface portion.

20 Claims, 9 Drawing Sheets

(56) References Cited

U.S. PATENT DOCUMENTS

| | | |
|---|---|---|
| 2004/0090432 A1 | 5/2004 | Takahashi et al. |
| 2006/0114237 A1 | 6/2006 | Crockett et al. |
| 2007/0075648 A1 | 4/2007 | Blythe et al. |
| 2009/0153519 A1 | 6/2009 | Suarez Rovere |
| 2011/0157096 A1* | 6/2011 | Drumm ............. G06F 3/0421 345/175 |
| 2011/0169780 A1* | 7/2011 | Goertz ............. G06F 3/0416 345/175 |
| 2011/0227874 A1 | 9/2011 | Fahraeus et al. |
| 2012/0268403 A1 | 10/2012 | Christiansson |
| 2013/0044073 A1 | 2/2013 | Christiansson et al. |
| 2013/0201142 A1 | 8/2013 | Suarez Rovere |

FOREIGN PATENT DOCUMENTS

| | | | |
|---|---|---|---|
| KR | 100940435 B1 | 2/2010 | |
| WO | WO-2009/048365 A1 | 4/2009 | |
| WO | WO-2009/077962 A2 | 6/2009 | |
| WO | WO-2010/006882 A2 | 1/2010 | |
| WO | WO-2010/006883 A2 | 1/2010 | |
| WO | WO-2010/006884 A2 | 1/2010 | |
| WO | WO-2010/006885 A2 | 1/2010 | |
| WO | WO-2010/006886 A2 | 1/2010 | |
| WO | WO 2010/064983 A2 * | 6/2010 | ............ G06F 3/042 |
| WO | WO-2010/064983 A2 | 6/2010 | |
| WO | WO-2010/134865 A1 | 11/2010 | |
| WO | WO-2011/028169 A1 | 3/2011 | |
| WO | WO-2011/049511 A1 | 4/2011 | |
| WO | WO-2011/049512 A1 | 4/2011 | |
| WO | WO-2011/049513 A1 | 4/2011 | |
| WO | WO-2011/139213 A1 | 11/2011 | |
| WO | WO-2012/050510 A1 | 4/2012 | |
| WO | WO-2012/121652 A1 | 9/2012 | |
| WO | WO-2013/055282 A2 | 4/2013 | |

OTHER PUBLICATIONS

European Examination Report dated Aug. 3, 2015 issued in corresponding European Application No. 12860074.9.

International Search Report and Written Opinion dated Aug. 26, 2013 issued in corresponding International Application No. PCT/SE2012/051419.

Natterer, "The Mathematics of Computerized Tomography", Classics in Applied Mathematics; 32, 2001, pp. 1-222.

Kak et al, "Principles of Computerized Tomographic Imaging", (1999), The Institute of Electrical Engineers, Inc.

* cited by examiner

TOUCH DETERMINATION WITH INTERACTION COMPENSATION

CROSS-REFERENCE TO RELATED APPLICATIONS

The present application is the National Phase of International Application No. PCT/SE2012/051419, filed 18 Dec. 2012, which claims priority to Swedish patent application No. 1151261-3, filed 22 Dec. 2011, and U.S. provisional application No. 61/579,291, filed 22 Dec. 2011, both of which are incorporated herein by reference.

TECHNICAL FIELD

The present invention relates to touch sensing systems that operate by light transmission inside light transmissive panels, and in particular to the processing of touch signals in such systems.

BACKGROUND ART

Touch sensing systems ("touch systems") are in widespread use in a variety of applications. Typically, the touch systems are actuated by a touch object such as a finger or stylus, either in direct contact, or through proximity (i.e. without contact), with a touch surface. Touch systems are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

To an increasing extent, touch systems are designed to be able to detect two or more touches simultaneously, this capability often being referred to as "multi-touch" in the art.

There are numerous known techniques for providing multi-touch sensitivity, e.g. by using cameras to capture light scattered off the point(s) of touch on a touch panel, or by incorporating resistive wire grids, capacitive sensors, strain gauges, etc into a touch panel.

U.S. Pat. No. 7,432,893 discloses a touch system that is operated by transmission of light inside a light transmissive panel. The touch system comprises two or more light sources that emit light into the panel such that the light propagates inside the panel with internal reflections and is detected by detectors around the periphery of the panel. An object touching the panel may frustrate the light whereby part of the light will leave its original propagation path and the detected signal will decrease. The location of the touching object may be computed using triangulation.

US 2009/0153519 also discloses a touch system that is operated by internal transmission of light. The touch system is defined as a "tomograph" comprising a light transmissive panel with flow-ports around the edges. Light is injected at one flow-port, propagates by internal reflection inside the panel and is transmitted from the panel at another flow-port, where a detector is arranged to measure the received light energy. An object touching the panel frustrates the light inside the panel and thereby decreases the transmitted light. The location of the touching object is computed by processing the received light energy at the flow-ports using well-known tomography methods.

WO 2010/064983 discloses an improved technique for processing of touch signals that represent detected light energy on a plurality of detection lines that extend across a touch surface of a light transmissive panel. The touch signals are processed into normalized signals that represent a ratio between light that is transmitted inside the panel when no objects are touching the panel and the light that is transmitted when there is one or more objects touching the panel.

WO 2011/139213 discloses an improved technique for tomographic reconstruction based on the touch signals from a touch system that is operated by transmission of light inside a light transmissive panel. The touch signals, which represent detected energy on a plurality of detection lines across the touch surface, are processed to generate a set of matched samples, which are indicative of estimated detected energy for fictitious detection lines that have a location on the surface portion that matches a standard geometry for tomographic reconstruction. This technique enables the touch system to be designed with any arrangement of detection lines across the panel, i.e. even arrangements that are mismatched to conventional tomographic techniques.

There remains a need to further improve the techniques of enabling detection of touching objects in touch systems that operate by frustration of light that is transmitted inside a light transmissive panel.

SUMMARY

It is an objective of the invention to at least partly overcome one or more limitations of the prior art.

Another objective is to enable improved touch detection in an optical touch system that propagates light on a plurality of paths inside a light transmissive panel to one or more light detectors.

One or more of these objectives, as well as further objectives that may appear from the description below, are at least partly achieved by means of a method, a computer program product, a device and a touch-sensitive apparatus according to the independent claims, embodiments thereof being defined by the dependent claims.

A first aspect of the invention is a method of processing an output signal from a touch-sensitive apparatus. The touch-sensitive apparatus comprises a light transmissive panel configured to propagate light by internal reflections from a plurality of incoupling points to a plurality of outcoupling points, thereby defining detection lines that extend across a surface portion of the panel between pairs of incoupling and outcoupling points, wherein each location on the surface portion is illuminated by incident light rays such that an object in contact with the surface portion interacts with the incident light rays of a subset of the detection lines, the touch-sensitive apparatus further comprising at least one light detector coupled to the outcoupling points to generate the output signal. The method comprises a step of obtaining, based on the output signal, signal values for the detection lines, the signal values being indicative of an apparent interaction between the object and light propagating on the respective detection line, and a step of processing the signal values to generate touch data indicative of the location of the object on the surface portion. The step of processing comprises a step of generating compensated signal values by operating compensation data on the signal values to at least partly compensate for variations in the apparent interaction among the subset of the detection lines that interact with the object, wherein the compensation data is obtained to at least represent the variations that are caused by differences in incident power distribution among the subset of the detection lines, the incident power distribution being a distribution of power among the incident light rays on the respective detection line with respect to a normal direction of the surface portion, and a step of processing the compensated signal values to generate the touch data.

The first aspect is based on the insight by the present Applicant that this type of optical touch system exhibits an "interaction imbalance" (also denoted "attenuation imbalance" herein). The interaction imbalance features an apparent difference in interaction on different detection lines even though the detection lines interact with one and the same object. Such an interaction imbalance may cause inaccuracies in the generated touch data, or even make it difficult to generate the touch data. The interaction imbalance occurs for all detection lines that interact with the object. A detection line that extends across the surface portion typically includes light rays on many different "internal reflection paths", which means that the light rays propagate with different reflection angles to the surface portion. The present Applicant has found that the interaction imbalance may be at least partly attributed to differences between the detection lines in the incident power distribution of the light rays that interact with the object. According to the first aspect, the compensation data is designed to account for these variations so as to compensate, wholly or partly, for the interaction imbalance. Each incident power distribution (denoted "power profile" in the detailed description) may be seen as a distribution of power among the incident light rays on the respective detection line with respect to a normal direction of the surface portion. The incident power distribution is thus a distribution of power/intensity/energy over different angles of incidence to the surface portion.

Thus, the inventive compensation is implemented to at least partly compensate for the interaction imbalance, i.e. for variations in the apparent interaction among the subset of detection lines that interact with the object. The apparent interaction denotes the interaction that may be derived from the output signal of the light detector(s) in the touch system, and the apparent interaction is embedded in the signal values that are obtained from the output signal. As noted above, the present invention is focused on compensating for the interaction imbalance that is caused by differences in the incident power distribution among the detection lines. These differences may originate at the incoupling points, e.g. that the light is injected into the panel with a different range of angles to the normal of the surface portion for different detection lines (also referred to as differences in the input power profile, $E_{in}(\theta)$). The differences may also originate from phenomena such as bulk absorption in the light transmissive panel and reflection losses as the light propagates along the respective detection line. These phenomena may cause the incident power distribution of the light that reaches the detector(s) to vary between detection lines of different extent in the plane of the surface portion. Irrespective of origin, variations in the incident power distribution of the light that reaches the detector(s) may cause corresponding variations in the signal response of the light detector for different detection lines, resulting in variations in the apparent interaction. Further variations in the apparent interaction may occur if the range of reflection angles that generate a signal response at the light detector(s) differs between the detection lines (also referred to as differences in the sensitivity profile, $\chi(\theta)$). Embodiments of the invention are configured to account for one or more of these causes for interaction imbalance.

Although the first aspect is defined in relation to a single object on the surface portion, it is understood that the compensation for interaction imbalance may be equally applied to other objects on the surface portion, irrespective of the type of object. It is also to be understood that the subset of the detection lines that interact with the object will change as the object is moved on the surface portion. The object may be a "touching object", which denotes an object that is intentionally and actively brought into contact with the surface portion of the light transmissive panel by a user. For example, the touching object may be a finger or a stylus. However, the inventive compensation may also be applied to non-intentional objects, such as fingerprints, smear, spills, etc on the surface portion, if there is a desire to accurately identify such non-intentional objects.

According to the first aspect, the compensated signal values are processed to generate the touch data, which may include one of location coordinates, shape, area and size of the one or more objects. In one embodiment, the touch data is generated directly from the compensated signal values, e.g. by means of a triangulation technique. The use of compensated signal values may facilitate or enable such triangulation. In another embodiment, an image of the surface portion is first generated as a function of the compensated signal values, the image representing changes in local interaction with the propagating light caused by the one or more objects. For example, an image reconstruction algorithm may be operated on the compensated signal values. Then, the image is processed for determination of the touch data. The use of compensated signal values may suppress distortions in the image caused by the interaction imbalance. Furthermore, by effecting the compensation as a separate step upstream of the image generation, it is possible both to achieve a fast and well-controlled compensation and allow, if desired, for the use of existing and conventional techniques for image generation.

As will be further explained with reference to example embodiments, the signal values and the compensated signal values may but need not be in the same format. For example, the compensated signal values may be in a normalized format, e.g. attenuation or transmission, whereas the signal values may be in a format provided by the light detector(s), e.g. energy/power/intensity. Thus, even if the signal values are not given in an "interaction format", they are nevertheless indicative of the apparent interaction between the object and the respective detection line.

In one embodiment, the compensated signal values are generated to indicate an equivalent interaction between the object and the subset of detection lines that interact with the object. This amounts to a compensation for "interaction imbalance". An "equivalent interaction" may mean that the interaction is essentially the same for all detection lines that are affected by one and the same object. Alternatively, the compensated signal values are generated to also factor in the extent of the intersection between the detection line and the touching object, whereby the interaction may differ between the detection lines that are affected by one and the same object, but the interaction is still equivalent for these detection lines. It should be noted that the compensation for interaction imbalance need not compensate for differences in interaction between objects, although this is possible.

In one embodiment, the compensation data comprises compensation values, each compensation value being associated with one or more of the detection lines, and the compensated signal values may be generated by operating the compensation values on the signal values of the associated detection lines, e.g. by multiplication, division, addition or another mathematical operation. Each such compensation value may be given as a function of at least one of: a length of the respective detection line in the plane of the surface portion, a first propagation angle in the plane of the surface portion between the respective detection line and a reference direction from the incoupling point, and a second propagation angle in the plane of the surface portion between the respective detection line and a reference direction from the outcoupling point.

In one embodiment, the compensation values are pre-computed. In an alternative embodiment, the method is repeated at successive time points during operation of the touch-sensitive apparatus, and the compensation values are re-computed at said successive time points.

In one embodiment, the compensation values are generated by one of a reference measurement and a mathematical simulation model.

In one embodiment, each detection line is associated with one of the compensation values, and the compensation values are operated on the signal values by a function that causes the apparent interaction to be essentially unchanged for the detection lines that are free of interaction with the object.

In one embodiment, the signal values represent signal attenuation on the detection lines, the signal attenuation being zero in absence of interaction, and the step of generating the compensated signal values comprises multiplying the compensation value with the signal values of the associated detection line, wherein the compensation value is obtained to be proportional to the length of the associated detection line in the plane of the surface portion raised by an exponent $\alpha$, wherein the exponent is given by $0.1<\alpha<0.9$, and preferably $0.3 \leq \alpha \leq 0.6$.

In one embodiment, the method further comprises a step of obtaining said compensation data, which comprises: identifying a preliminary location of the object on the surface portion, and obtaining the compensation data as a function of the preliminary location. The step of obtaining compensation data may further comprise: identifying, based on the preliminary location, the subset of the detection lines that interact with the object, and obtaining the compensation data for the subset of the detection lines. Alternatively or additionally, the compensation data may be obtained specifically for the preliminary location. Alternatively or additionally, the step of identifying the preliminary location comprises: obtaining input data based on the signal values; and processing the input data to identify the preliminary location of the object. The input data may comprise at least part of the signal values. Alternatively, the step of obtaining the input data may comprise: obtaining preliminary compensation data, and operating the preliminary compensation data on the signal values to generate pre-compensated signal values in which the variations in the apparent interaction are reduced, and processing the pre-compensated signal values to identify the preliminary location. In another alternative embodiment, the method is repeated at successive time points during operation of the touch-sensitive apparatus, and the step of identifying the preliminary location comprises: retrieving a location of the object given by the touch data generated at a previous time point.

The first aspect may be more generally defined as a method of processing an output signal from a touch-sensitive apparatus, which comprises a light transmissive panel configured to propagate light by internal reflections from a plurality of incoupling points to a plurality of outcoupling points, thereby defining detection lines that extend across a surface portion of the panel between pairs of incoupling and outcoupling points, and at least one light detector coupled to the outcoupling points to generate the output signal which is indicative of interaction between said one or more objects and light propagating on the detection lines. The method comprises a step of obtaining, based on the output signal, a signal value for each detection line; and a step of processing the signal values to generate touch data indicative of said one or more objects on the surface portion. The step of processing comprises a step of operating compensation data on the signal values to generate compensated signal values which indicate an equivalent interaction between each individual object and the light propagating on the detection lines that interact with the individual object; and a step of processing the compensated signal values to generate the touch data.

A second aspect of the invention is a computer program product comprising computer code which, when executed on a data-processing system, is adapted to carry out the method of the first aspect.

A third aspect of the invention is a device for processing an output signal from a touch-sensitive apparatus. The touch-sensitive apparatus comprises a light transmissive panel configured to propagate light by internal reflections from a plurality of incoupling points to a plurality of outcoupling points, thereby defining detection lines that extend across a surface portion of the panel between pairs of incoupling and outcoupling points, wherein each location on the surface portion is illuminated by incident light rays such that an object in contact with the surface portion interacts with the incident light rays of a subset of the detection lines. The touch-sensitive apparatus further comprises light detection means coupled to the outcoupling points to generate the output signal. The device comprises: means for receiving the output signal; means for obtaining, based on the output signal, signal values for the detection lines, the signal values being indicative of an apparent interaction between the object and light propagating on the respective detection line; and means for processing the signal values to generate touch data indicative of the object on the surface portion, wherein said means for processing comprises: means for generating compensated signal values by operating compensation data on the signal values to at least partly compensate for variations in the apparent interaction among the subset of the detection lines that interact with the object, wherein the compensation data is obtained to at least represent the variations that are caused by differences in incident power distribution among the subset of the detection lines, the incident power distribution being a distribution of power among the incident light rays on the respective detection line with respect to a normal direction of the surface portion; and means for processing the compensated signal values to generate said touch data.

A fourth aspect of the invention is a device for processing an output signal from the above-mentioned touch-sensitive apparatus. The device comprises: an input for the output signal; and a signal processor connected to the input and configured to obtain, based on the output signal, signal values for the detection lines, the signal values being indicative of an apparent interaction between the object and light propagating on the respective detection line; and process the signal values to generate touch data indicative of the object on the surface portion. The signal processor is further configured to generate compensated signal values by operating compensation data on the signal values to at least partly compensate for variations in the apparent interaction among the subset of the detection lines that interact with the object, wherein the compensation data is obtained to at least represent the variations that are caused by differences in incident power distribution among the subset of the detection lines, the incident power distribution being a distribution of power among the incident light rays on the respective detection line with respect to a normal direction of the surface portion; and process the compensated signal values to generate said touch data.

A fifth aspect of the invention is a touch sensitive apparatus, comprising: a light transmissive panel configured to propagate light by internal reflections from a plurality of incoupling points to a plurality of outcoupling points, thereby defining detection lines that extend across a surface portion of the light transmissive panel between pairs of incoupling and outcoupling points, wherein each location on the surface portion is illuminated by incident light rays such that an object in contact with the surface portion interacts with the incident light rays of a subset of the detection lines; light providing means for providing the light at the incoupling points; light detection means coupled to the outcoupling points to generate an output signal; and the device according to the third or fourth aspect.

A sixth aspect of the invention is a touch-sensitive apparatus, comprising: a light transmissive panel configured to propagate light by internal reflections from a plurality of incoupling points to a plurality of outcoupling points, thereby defining detection lines that extend across a surface portion of the light transmissive panel between pairs of incoupling and outcoupling points, wherein each location on the surface portion is illuminated by incident light rays such that an object in contact with the surface portion interacts with the incident light rays of a subset of the detection lines; at least one light emitter optically coupled to the incoupling points to provide the light; at least one light detector optically coupled to the outcoupling points to generate an output signal; and the device according to the third or fourth aspect.

Any one of the above-identified embodiments of the first aspect may be adapted and implemented as an embodiment of the second to sixth aspects.

Still other objectives, features, aspects and advantages of the present invention will appear from the following detailed description, from the attached claims as well as from the drawings.

DETAILED DESCRIPTION OF EXAMPLE EMBODIMENTS

Figure 1A:
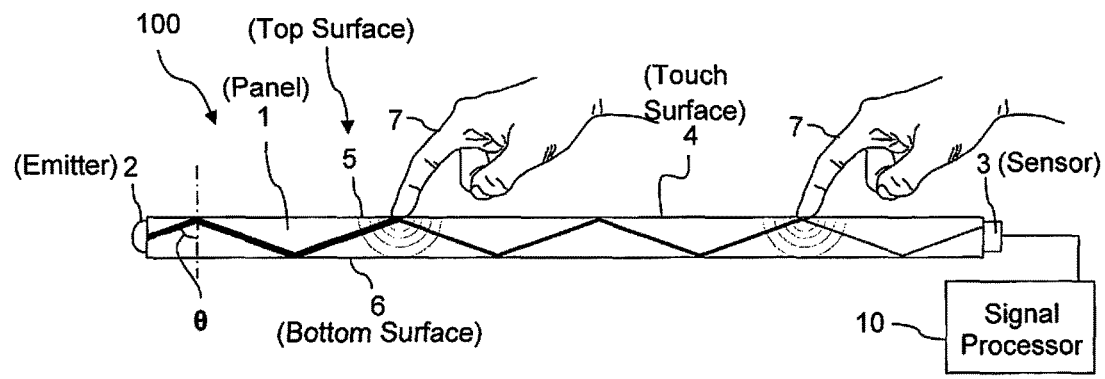
FIG. 1A-1B are side and top plan views of touch systems operating by frustrated total internal reflection (FTIR).

The present invention relates to techniques for processing the signal from a touch sensitive apparatus. The description starts out by presenting the concept of such a touch sensitive apparatus operating by frustrated total internal reflection (FTIR) of light. The description continues to present embodiments of the invention. Throughout the description the same reference numerals refer to the same elements.

1. Touch-Sensitive Apparatus

Figure 1B:
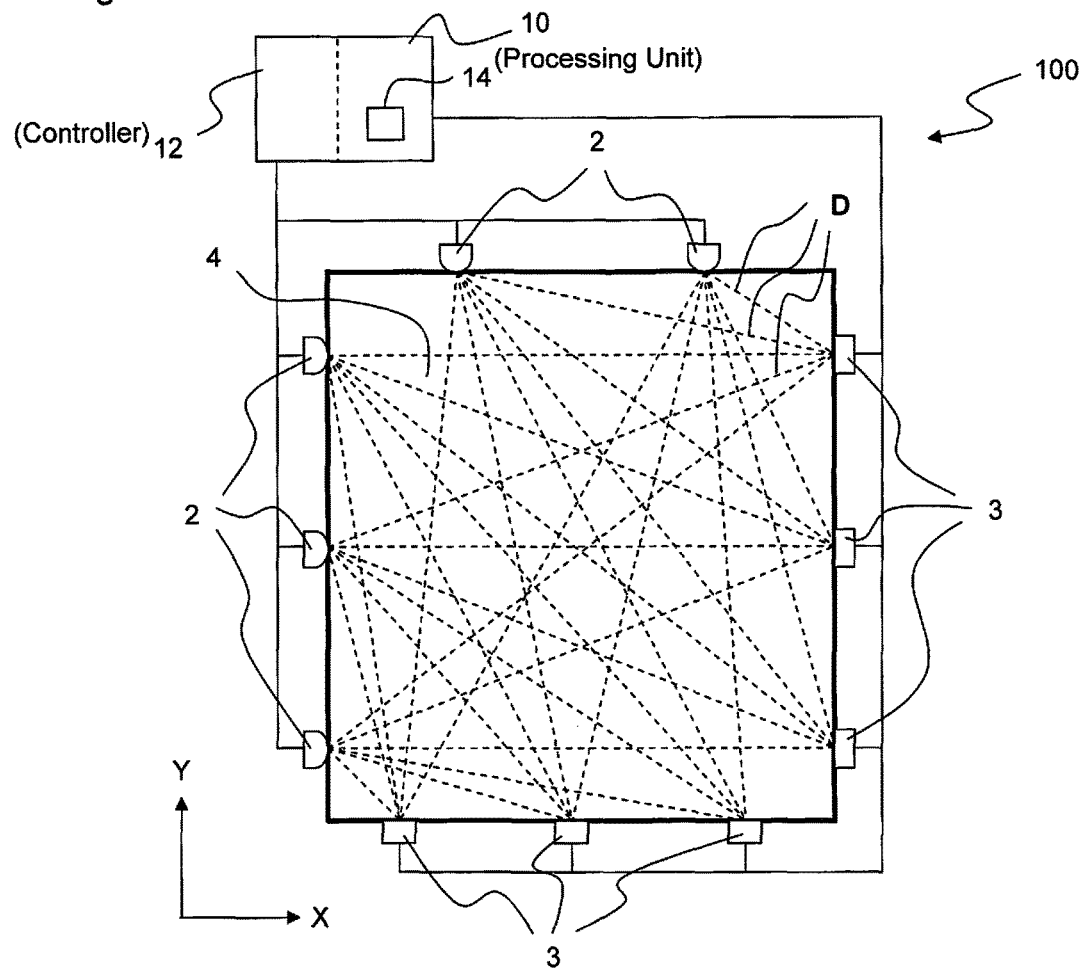

FIGS. 1A-1B illustrate an example embodiment of a touch-sensitive apparatus 100 that is based on the concept of FTIR, also denoted an "FTIR system" herein. The apparatus 100 operates by transmitting light inside a panel 1, from light emitters 2 to light sensors or detectors 3, so as to illuminate a touch surface 4 from within the panel 1. The panel 1 is made of solid material in one or more layers and may have any shape. The panel 1 defines an internal radiation propagation channel, in which light propagates by internal reflections. In the example of FIG. 1, the propagation channel is defined between the boundary surfaces 5, 6 of the panel 1, where the top surface 5 allows the propagating light to interact with touching objects 7 and thereby defines the touch surface 4. This is achieved by injecting the light into the panel 1 such that the light is reflected by total internal reflection (TIR) in the touch surface 4 as it propagates through the panel 1. The light may be reflected by TIR in the bottom surface 6 or against a reflective coating thereon. It is conceivable that the propagation channel is spaced from the bottom surface 6, e.g. if the panel 1 comprises multiple layers of different materials. The apparatus 100 may be designed to be overlaid on or integrated into a display device or monitor (not shown).

To sustain propagation by TIR, the light must have an angle of incidence (AOI) $\theta$ to the touch surface 4 that exceeds the critical angle at the touch surface 4, denoted $\theta_c$ herein, as is well-known to the skilled person. For brevity, the angle of incidence $\theta$ at the touch surface 4 is denoted "bounce angle" in the following.

The apparatus 100 allows an object 7 that is brought into close vicinity of, or in contact with, the touch surface 4 to interact with the propagating light at the point of touch. In this interaction, part of the light may be scattered by the object 7, part of the light may be absorbed by the object 7, and part of the light may continue to propagate in its original direction across the panel 1. Thus, the touching object 7 causes a local frustration of the total internal reflection, which leads to a decrease in energy (power/intensity) of the transmitted light, as indicated by the thinned lines downstream of the touching objects 7 in FIG. 1A. The object 7 may be of any type, e.g. animate (digit, finger, toe, palm, etc) or inanimate (stylus, pen, pointer, etc).

The emitters 2 are distributed along the perimeter of the touch surface 4 to generate a corresponding number of light sheets inside the panel 1. In the example of FIG. 1B, each emitter 2 generates a beam of light that expands in the plane of the panel 1 while propagating in the panel 1. Each beam propagates from one or more entry or incoupling points (ports) on the panel 1. The sensors 3 are distributed along the perimeter of the touch surface 4 to receive the light from the emitters 2 at a number of spaced-apart outcoupling points (ports) on the panel 1.

The above-mentioned incoupling and outcoupling points refer to the positions where the beams enter and leave, respectively, the panel 1. It should be understood that one emitter/sensor may be optically coupled to a number of incoupling/outcoupling points. In the example of FIG. 1B, however, the detection lines D are defined by individual emitter-sensor pairs.

The sensors 3 collectively provide an output signal, which is received and sampled by a signal processor 10. The output signal contains a number of sub-signals, also denoted "projection signals", each representing the energy (or equivalently, intensity or power) of light emitted by a certain light emitter 2 and received by a certain light sensor 3. Depending on implementation, the signal processor 10 may need to process the output signal for separation of the individual projection signals. Conceptually, the touch apparatus 100 is considered to define a grid of detection lines D on the touch surface 4, where each detection line D corresponds to a light propagation path from an emitter 2 to a sensor 3, as projected onto the touch surface 4. Thus, the projection signals represent the received energy/power/intensity of light on the individual detection lines D. It is realized that the touching object 7 results in a decrease (attenuation) of the received energy on one or more detection lines D.

As will be explained below, the signal processor 10 may be configured to process the projection signals so as to determine a distribution of attenuation values (for simplicity, referred to as an "attenuation pattern" or "attenuation image") across the touch surface 4, where each attenuation value represents a local attenuation of light. The attenuation pattern may be represented in many different ways, e.g. as attenuation values arranged in a regular X,Y-grid, such as in an ordinary digital image, although other types of regular and non-regular grids are conceivable, e.g. hexagonal patterns or triangular meshes. The attenuation pattern may be further processed by the signal processor 10 or by a separate device (not shown) for touch determination, which may involve extraction of touch data, such as an estimated position (e.g. X,Y coordinates), shape or area of each touching object.

In the illustrated example, the apparatus 100 also includes a controller 12 which is connected to selectively control the activation of the emitters 2 and, possibly, the readout of data from the sensors 3. The signal processor 10 and the controller 12 may be configured as separate units, or they may be incorporated in a single unit. One or both of the signal processor 10 and the controller 12 may be at least partially implemented by software executed by a processing unit 14.

It is to be understood that FIG. 1 merely illustrates an example of an FTIR system. For example, the detection lines may instead be generated by sweeping or scanning one or more beams of light inside the panel 1, and the light may instead be coupled into and out of the panel 1 via the edge surface, the top surface 5 or the bottom surface 6 by the use of dedicated coupling elements attached to the panel 1. Examples of alternative FTIR systems are e.g. disclosed in U.S. Pat. No. 6,972,753, U.S. Pat. No. 7,432,893, US2006/0114237, US2007/0075648, WO2009/048365, WO2010/006882, WO2010/006883, WO2010/006884, WO2010/006885, WO2010/006886, WO2010/064983, and WO2010/134865, which are all incorporated herein by this reference. The inventive concepts may be applied to such alternative FTIR systems as well.

2. Attenuation Pattern

A reconstruction function or algorithm may be used for determining the attenuation pattern on the touch surface 4, based on the projection signals in the output signal. Embodiments of the invention may use any available algorithm for image reconstruction based on projection signal values, including tomographic reconstruction techniques such as Filtered Back Projection, FFT-based algorithms, ART (Algebraic Reconstruction Technique), SART (Simultaneous Algebraic Reconstruction Technique), etc. Alternatively, the reconstruction function may generate the attenuation pattern by adapting one or more basis functions and/or by statistical methods such as Bayesian inversion. Examples of such reconstruction functions designed for use in touch determination are found in WO 2010/006883, WO2009/077962, WO2011/049511, WO2011/139213, and WO2012/050510, all of which are incorporated herein by reference. Conventional reconstruction techniques are found in the mathematical literature, e.g. "The Mathematics of Computerized Tomography" by Natterer, and "Principles of Computerized Tomographic Imaging" by Kak and Slaney.

The reconstruction function is designed based on the assumption that the input values $s_t$ at time point t depend on the attenuation pattern $a_t$ according to a projection function $\mathcal{P}$, which reflects physical properties of the FTIR system: $s_t = \mathcal{P}(a_t)$. The reconstruction algorithm is thus designed to reconstruct $a_t$ from $s_t$ by use of a reconstruction function: $a_t = \mathcal{P}'(s_t)$.

It is to be understood that the format of the input values $s_t$ may be specific to the reconstruction function $\mathcal{P}'$. To enable reconstruction of an attenuation pattern, the input values $s_t$ may be represented as attenuation values for individual detection lines D. Such attenuation values may e.g. be based on transmission values obtained by dividing the projection value $I_k$ of the k:th detection line by a respective reference value: $T_k = I_k/REF_k$. By proper choice of reference values, the transmission values may be generated to represent the fraction (e.g. in the range [0, 1]) of the available light energy that has been measured on each of the detection lines. The input value of each detection line may e.g. be given by: $s_k = -\log(T_k)$ or an approximation thereof, e.g. $s_k = 1 - T_k$, which are both indicative of attenuation.

Figure 2:
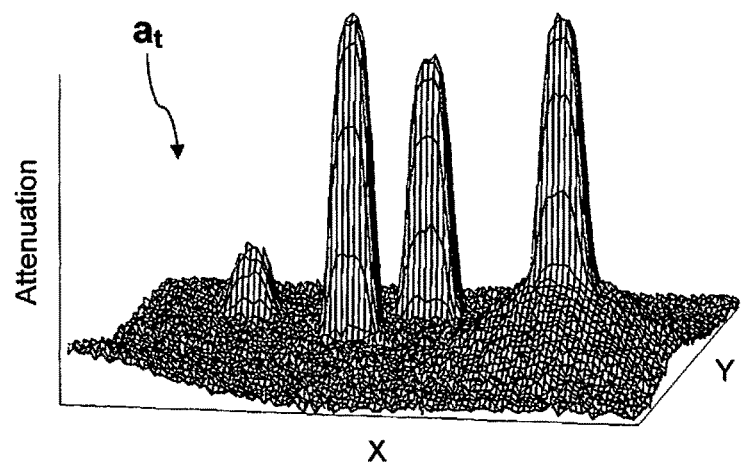
FIG. 2 is a 3D plot of a reconstructed attenuation pattern.

A reconstructed pattern $a_t$ is illustrated in FIG. 2A as a 3D plot in the X,Y coordinate system of the touch surface 4 (cf. FIG. 1B). The pattern $a_t$ represents the total attenuation on the touch surface 4, caused by touching objects as well as contamination, such as fingerprints and spills. The influence of contamination may be at least partly eliminated using the compensation techniques proposed in WO2011/049512 and WO2011/028169, which are incorporated herein by reference. The attenuation pattern may be generated to represent changes in touch-related attenuation on any desired time scale. For example, attenuation changes that occur over a time period $\Delta t$ may be calculated by subtracting a pattern with a previous one: $da_t = a_t - a_{t-\Delta t}$ or by operating the reconstruction function on change values $ds_t$ that represent a difference in input values between the current time point (t) and the previous time point (t−Δt): $da_t = \mathcal{P}'(ds_t)$, assuming that the reconstruction function $\mathcal{P}'$ is at least approximately linear. The change values may be computed as the difference in input values: $ds_t = s_t - s_{t-\Delta t}$. Alternatively, the change values may be computed as a difference in logarithmic projection values: $ds_t = s_t - s_{t-\Delta t} = \log(I_{t-\Delta t}/REF) - \log(I_t/REF) = -\log((I_t/REF)/(I_{t-\Delta t}/REF)) = -\log(I_t/I_{t-\Delta t}) = \log(I_{t-\Delta t}) - \log(I_t)$.

Further alternatives for generating the attenuation pattern based on change values are disclosed in Applicant's PCT application WO/2013/055282 which is incorporated by reference in its entirety.

The pattern may be reconstructed within one or more subareas of the touch surface. The subareas may be identified by analyzing intersections of detection lines across the touch surface, based on the above-mentioned projection signals. Such a technique for identifying subareas is further disclosed in WO2011/049513, which is incorporated herein by this reference.

It is also conceivable that the pattern is reconstructed by triangulation, e.g. as described in aforesaid U.S. Pat. No. 7,432,893.

The purpose of reconstructing the pattern is to be able to extract touch data, e.g. location coordinates for objects on the touch surface. In certain implementations, e.g. when using triangulation techniques, it may be possible to extract the touch data directly, i.e. without having to reconstruct any pattern. Thus, all examples herein that refer to reconstruction of a pattern or image may be modified for direct extraction of touch data.

3. Attenuation Imbalance

Figure 3:
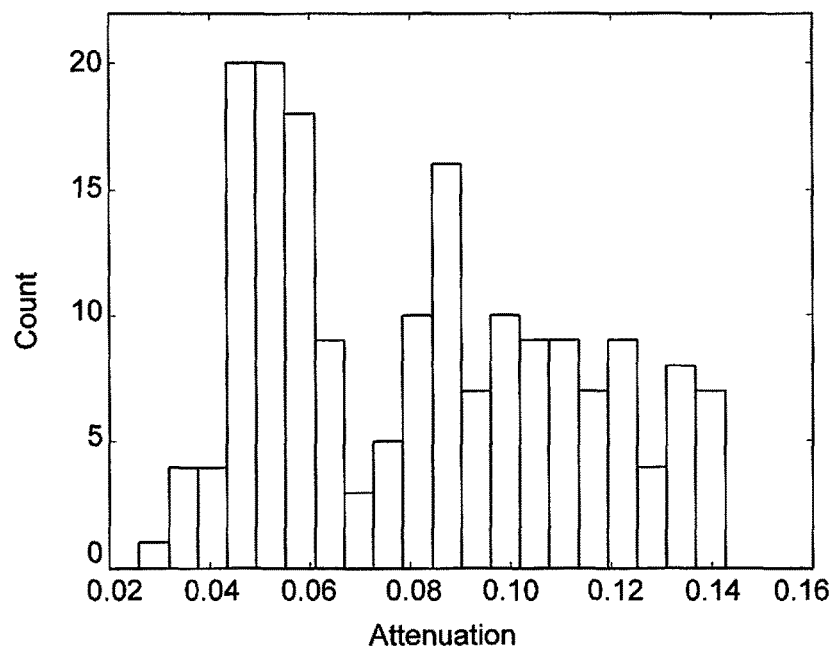
FIG. 3 is a histogram that illustrates attenuation imbalance between different detection lines.
Figure 4:
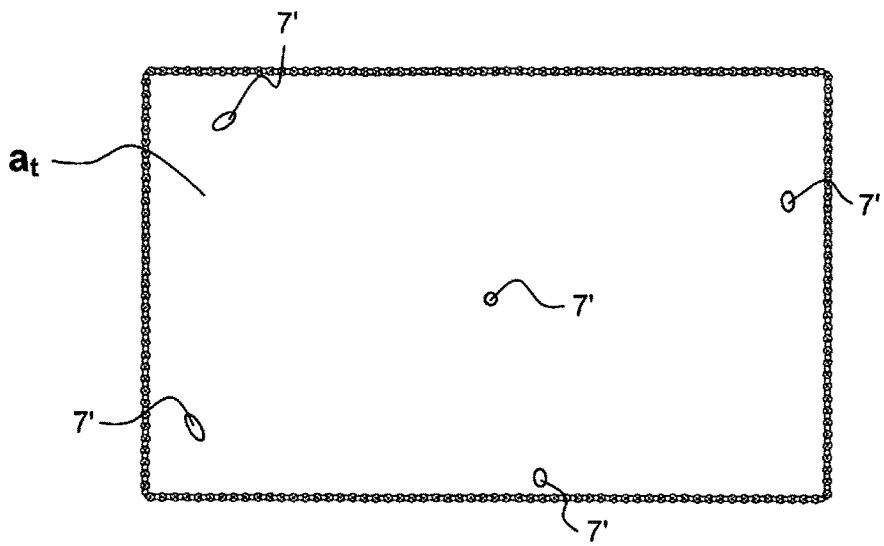
FIG. 4 is a 2D plot of an attenuation pattern to illustrate the result of attenuation imbalance.

Most reconstruction functions $\mathcal{P}'$ presume an "attenuation balance" between all detection lines that pass any point on the touch surface 4, i.e. that a touching object 7 results in the same attenuation of all detection lines, at least if the object has the same extent along all detection lines. It may be difficult to achieve such attenuation balance in an FTIR system. FIG. 3 is a histogram of the distribution of attenuation values $s_k = -\log(T_k)$ among the detection lines that interact with a circular object. Evidently, the attenuation values fall in the range of 0.03-0.14, when in fact the true attenuation should be approximately the same for all detection lines. This "attenuation imbalance" may have a severe impact on the resulting attenuation pattern, e.g. causing distortions in shape and/or size of the touches. FIG. 4 schematically illustrates an attenuation pattern $a_t$ that has been reconstructed when five circular objects are in contact with a rectangular FTIR system. As seen, the touches 7' representing the circular objects are more or less elliptical, with the distortion being worse at the perimeter of the touch surface 4. It is realized that such distortion may introduce errors in the touch data that is determined based on the attenuation pattern $a_t$.

Figure 5:
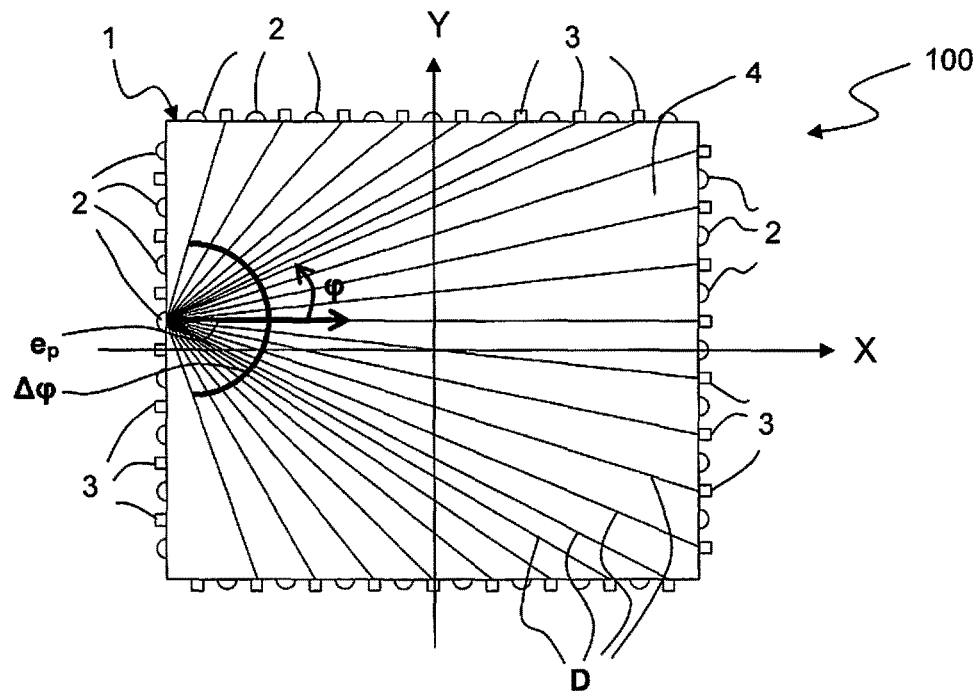
FIG. 5 is a top plan view of a touch system to illustrate detection lines originating from one emitter.
Figure 6:
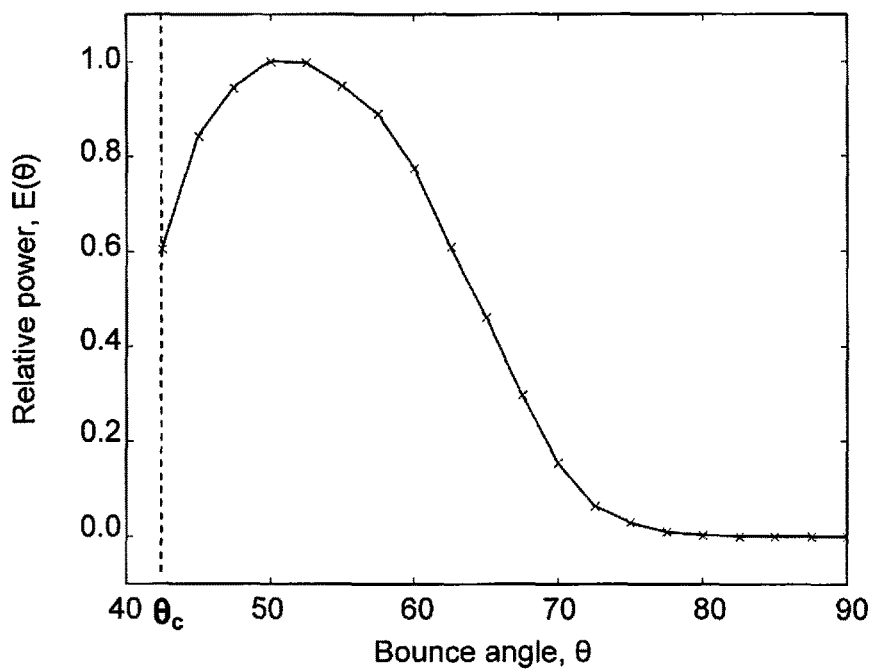
FIG. 6 is a graph of the power distribution as a function of bounce angle on one of the detection lines in FIG. 5.

To explain some causes for the attenuation imbalance, reference is made to the top plan view of FIG. 5, in which one of the emitters 2 has been activated to introduce a beam of light with a panel divergence $\Delta\phi$ in the plane of the panel 1. A plurality of detection lines D are thereby generated. Each detection line D has a propagation angle $\phi$ with respect to a main beam propagation direction $e_p$. The light is typically introduced into the panel 1 with a divergence in the depth direction (cf. FIG. 1A), which inherently causes a distribution of bounce angles for the propagating light. FIG. 6 illustrates the power profile $E(\theta)$ of such divergent light as a function of the bounce angle $\theta$, as measured for one of the detection lines D in FIG. 5 at a location on the panel 1 close to the active emitter. As seen, the power of the light is mainly distributed over a range of bounce angles from the critical angle $\theta_c$ to about 80°, with a peak at about 50 degrees. As will be shown in the following, differences in the power profile $E(\theta)$ among the detection lines may cause attenuation imbalance.

Figure 7:
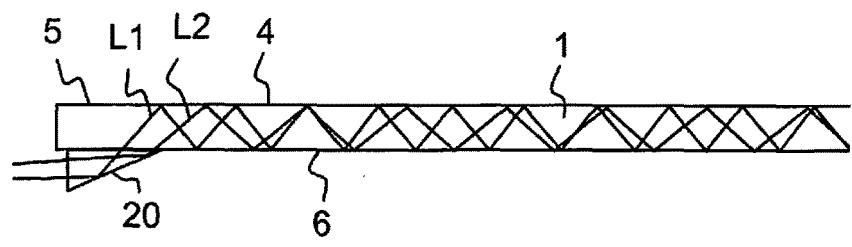
FIG. 7 is a side view of a touch system to illustrate to light rays with different bounce angles.

FIG. 7 illustrates how two light rays L1, L2, which are injected at different bounce angles, propagate inside the panel 1 from a wedge-shaped incoupling element 20 attached to the bottom surface 6. It is realized that the rays L1, L2 will have different optical path lengths (propagation lengths) in the panel 1. A detection line with a length of 800 mm (as measured in the plane of the touch surface 4) may comprise light rays with mutually different propagation lengths, such as 800 mm ($\theta=90°$), 940 mm ($\theta=60°$) and 1131 mm ($\theta=45°$). Thereby, bulk absorption will affect the rays L1, L2 differently. Bulk absorption is generally given by $I=I_o \cdot e^{-\alpha x}$, where $\alpha$ is a bulk attenuation coefficient and x is the propagation length. Bulk absorption will cause rays with small bounce angles to be more attenuated than rays with large bounce angles.

As seen in FIG. 7, the number of bounces in the touch surface 4 differs between rays L1, L2. Since each ray of light loses a fraction of its power every time it is reflected by TIR in the touch surface 4, the total bounce loss will differ between the rays L1, L2. The bounce loss for each reflection may, e.g., be in the range of 1-5%. Bounce loss will cause rays with small bounce angles to be more attenuated than rays with large bounce angles.

Figure 11:
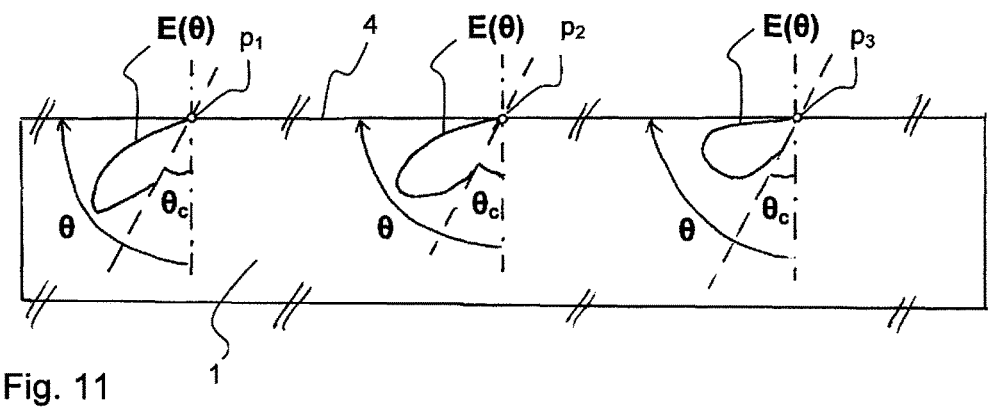
FIG. 11 is a side view of a light transmissive panel to illustrate how the power distribution as a function of bounce angle changes along a detection line.

FIG. 11 is a schematic and exemplifying illustration of the power profile $E(\theta)$ at three different points $p_1$, $p_2$, $p_3$ along a detection line, for light that propagates from an incoupling point (not shown) to the left of point $p_1$. In the illustrated example, the power profile $E(\theta)$ is shifted towards larger bounce angles along the detection line, i.e. with increasing distance from the incoupling point. It should be noted that the power profile $E(\theta)$ schematically illustrates the relative distribution of power (or equivalently, energy or intensity) as a function of $\theta$. In terms of absolute values, the power decreases significantly from left to right in FIG. 11.

It is realized that the bulk absorption and the bounce loss will cause the power profile $E(\theta)$ to vary between detection lines D of different length, e.g. among the detection lines in FIG. 5. Importantly, this means that power profile $E(\theta)$ of the light that reaches the respective outcoupling point differs between these detection lines D. This power profile is also denoted "output power profile" and is denoted $E_{out}(\theta)$ in the following. It should be noted that $E_{out}(\theta)$ defines the light on the detection line D that might be affected by a touching object 7 on the detection line D, assuming that the FTIR system is a "specular system". In specular systems, light is specularly reflected against the boundary surfaces 5, 6 and against the touching objects 7, and there is negligible light scattering by the bulk material of the panel 1. In such a system, even if the power profile $E(\theta)$ varies along the detection line D, it is only the light within the output power profile $E_{out}(\theta)$ that will propagate from each location along the detection line D to the outcoupling point and that may be affected by a touching object 7.

The skilled person understands that the projection values $I_k$ measured for the detection lines D by the sensors 3 are also affected by the sensitivity profile of the individual sensor 3 as a function of bounce angle $\theta$. The sensitivity profile, denoted $\chi(\theta)$, may be set by properties of the sensor 3 and its optical coupling to the panel 1. Reverting to FIGS. 5 and 6, the output power profile $E_{out}(\theta)$ may differ between detection lines D for other reasons as well. The emitter 2 and its optical coupling to the panel 1 may cause the power profile of the light that enters the panel 1 ("input power profile", $E_{in}(\theta)$) to vary between different propagation angles $\phi$ within the panel divergence $\Delta\phi$, and thus between different detection lines D. Corresponding differences may occur between detection lines D that originate from different emitters 2. Similarly, the sensitivity profile $\chi(\theta)$ may differ with angle in the plane of the panel 1, in analogy with the differences in input profile with propagation angle φ for the emitters 2.

In the following, the attenuation imbalance that is caused by bulk absorption and bounce loss along the respective detection line, while assuming that the input power profile $E_{in}(\theta)$ and the sensitivity profile $\chi(\theta)$ are identical for all detection lines, is denoted "line imbalance", since it originates from phenomena along each detection line. The attenuation imbalance that is caused by variations in the input power profile $E_{in}(\theta)$ and the sensitivity profile $\chi(\theta)$ between detection lines is denoted "external imbalance".

Figure 8:
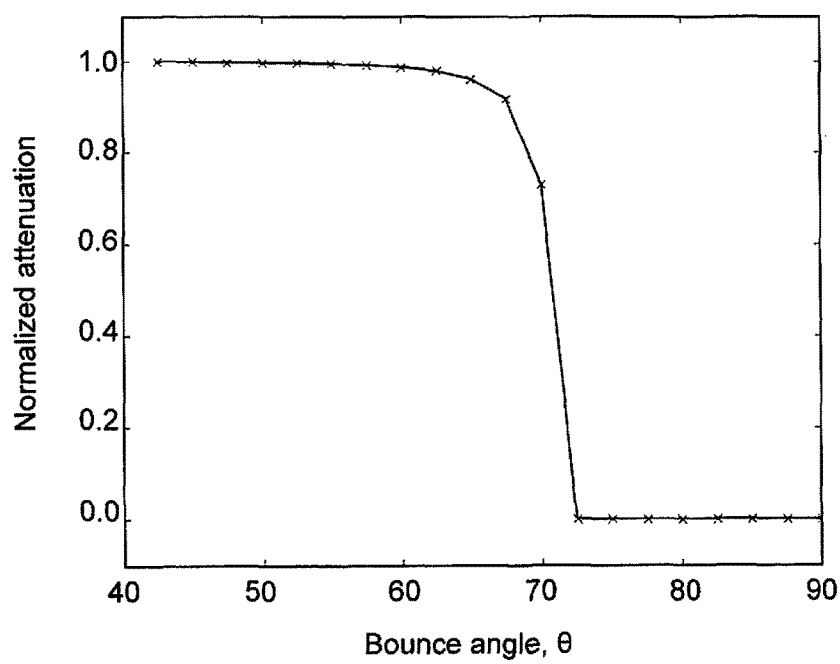
FIG. 8 is a graph of normalized attenuation of a touching object as a function of bounce angle.

An object 7 placed on the touch surface 4 at a particular position will interact with the light that impinges from within the panel 1 on the contact area between the object 7 and the touch surface 4 at that position. The degree of interaction has been found to be dependent on the angle of incidence of the light with respect to the normal of the touch surface 4. The angle of incidence corresponds to the above-mentioned bounce angle θ. FIG. 8 shows an example of how the degree of interaction may vary as a function of bounce angle for a human finger that touches a touch panel. The graph in FIG. 8 is a normalized attenuation profile that represents the fraction of incoming light, at different bounce angles, that is attenuated by the human finger. As seen, the attenuation drops off rapidly for bounce angles above about 70°. It should be noted that the data in FIG. 8 is normalized, and the normalized attenuation value of 1.0 in FIG. 8 may correspond to an absolute attenuation of about 0.1%-50%, e.g. depending on the configuration of the FTIR system (touch surface, wavelength of the light, etc) and the state of the finger (moisture, grease, skin type, etc).

Figure 9:
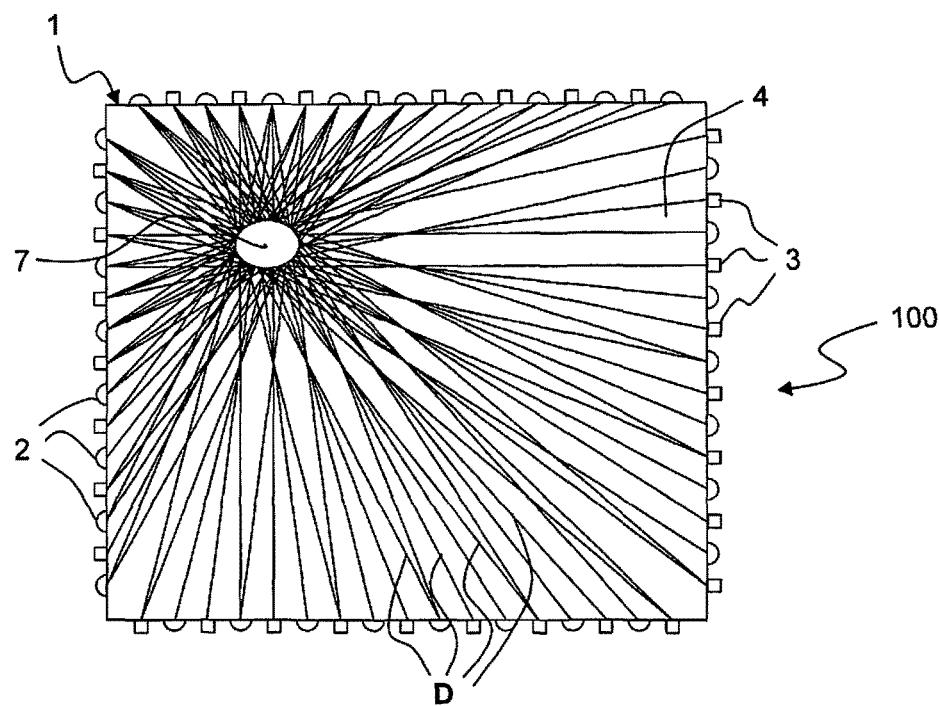
FIG. 9 is a top plan view of a touch system to illustrate detection lines that interact with a touching object.
Figure 10:
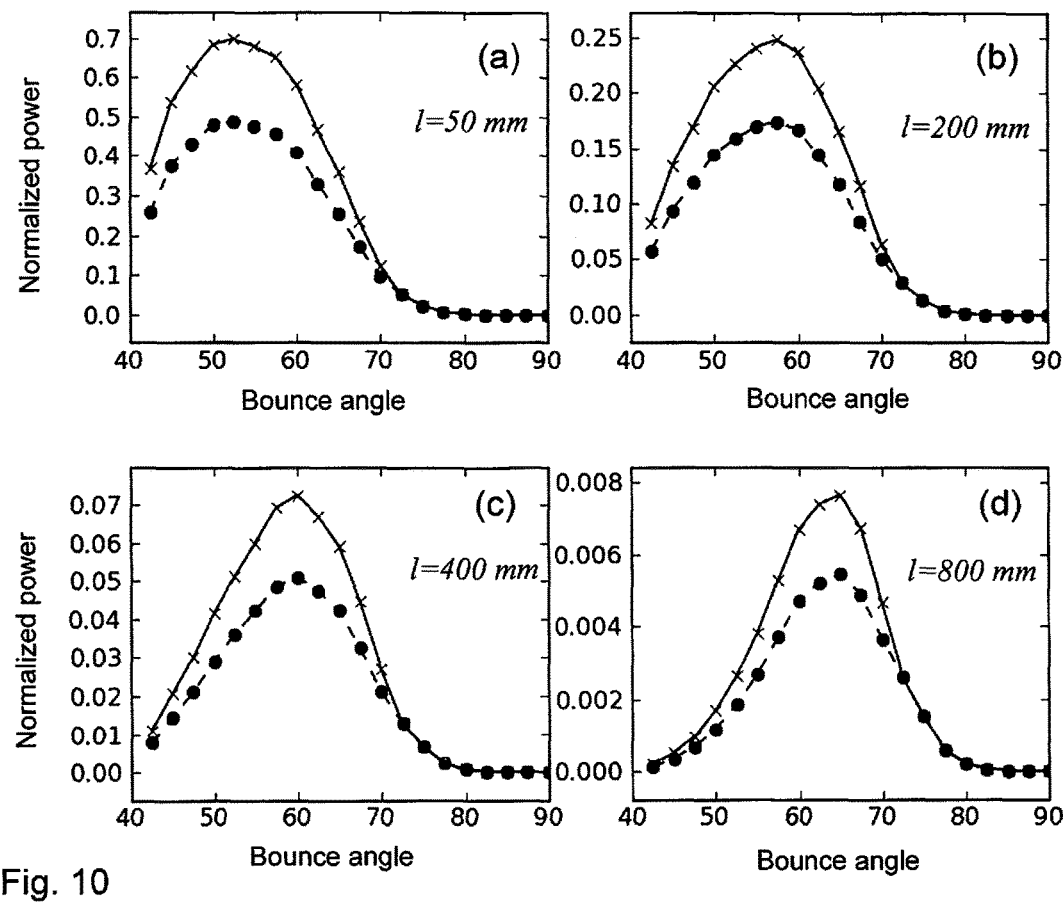
FIG. 10(a)-10(d) are graphs to illustrate the power distribution as a function of bounce angle, with and without touch interaction, for different detection line lengths.

FIG. 9 is a top plan view of an FTIR system illustrating all detection lines D that interact with a touching object 7. The attenuation values $s_k = -\log(T_k)$ obtained for the different detection lines D based on the projection values $I_k$ measured by the sensors 3 will depend, inter alia, on the output power profile $E_{out}(\theta)$ of the respective detection line D, the attenuation profile of the object 7, as well as the sensitivity profile $\chi(\theta)$ for the relevant sensor 3. Based on the foregoing discussion, it is realized that the output power profile $E_{out}(\theta)$ is likely to differ significantly between many of the detection lines D.

FIGS. 10(a)-10(d) are graphs of an exemplifying output power profile $E_{out}$ (solid line with crosses) as a function of bounce angle for different distances l from the incoupling point: 50 mm, 200 mm, 400 mm and 800 mm, respectively. The graphs also illustrate the corresponding result of an interaction between the power profile of light and an object that has 30% absolute attenuation and an attenuation profile as shown in FIG. 8. The result of this interaction is an attenuated power profile (dashed line with dots). This indicates that the attenuated power profile that reaches an outcoupling point for a detection line is shifted towards larger angles with increasing length of the detection line. Assuming that the sensor 3 integrates the power for all bounce angles, the measured attenuation (given as the ratio of the area between the power profile and the attenuated power profile to the area under the power profile) for the data in FIG. 10 is 29.1%, 28.7%, 27.9% and 25.8% for detection lines of length 50 mm, 200 mm, 400 mm and 800 mm, respectively. Thus, the difference in output power profile $E_{out}(\theta)$ results in an attenuation imbalance.

The present Applicant has also identified a further cause for attenuation imbalance, albeit most often of smaller magnitude than the causes discussed above, namely that the degree of interaction may depend on the location of the object along the individual detection line D. One cause for this effect may be that the FTIR system is not perfectly specular. Thereby, the relevant power profile that represent the light that reaches the outcoupling point may differ between different locations along the detection line D, i.e. the relevant power profile is no longer equal to the output power profile $E_{out}(\theta)$ as in a specular FTIR system.

4. Compensation for Attenuation Imbalance

In a first embodiment, the input values $s_t$ are compensated for the above-mentioned line imbalance, including the attenuation imbalance caused by the different lengths of the detection lines. As explained in Section 2, the input values $s_t$ are derived from the projection signals $I_t$ in a format matched to the reconstruction function $\mathcal{P}'$, e.g. to represent attenuation or transmission.

Figure 12:
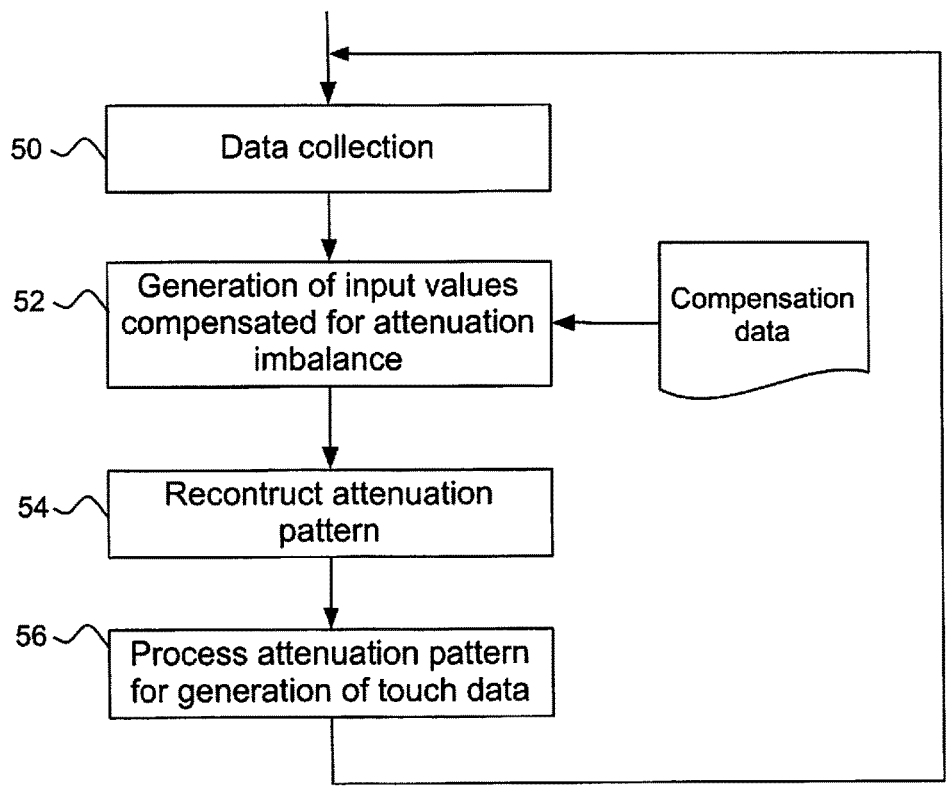
FIG. 12 is a flowchart of a compensation method according to a first embodiment.

FIG. 12 is a flowchart of a compensation method according to the first embodiment. The method operates in a repeating sequence of steps 50-56, wherein each sequence of steps is denoted an "iteration" or a "frame". The method starts with a step 50 of obtaining a current projection value for each detection line. In some touch systems, this may not result in a projection value for every detection line in the system, but rather a projection value for each detection line deemed relevant in a particular frame. The current projection values $I_t$ may be pre-processed, e.g. for noise reduction or ambient/contamination compensation, and converted into current input values $s_t$.

Then the method proceeds to a step 52 of generating compensated input values. The input values are compensated, using compensation data, for variations in touch interaction that arise from the different lengths of the detection lines. The compensation data may be predefined and stored in an electronic memory for retrieval by step 52, as shown, but it is also conceivable that the compensation data is computed for each frame. The compensation data comprises a compensation value for each detection line. The compensation value may be obtained solely as a function of the length of the detection line. Alternatively, to compensate for the above-mentioned external imbalance, the compensation data may be obtained also as a function of the direction of the detection line in relation to a reference direction of the emitter and/or the detector associated with the detection line (cf. the propagation angle φ in relation to the main beam propagation direction $e_p$ in FIG. 5).

It is to be noted that step 52 may operate the compensation values on the projection values $I_t$, the input values $s_t$, or any intermediate values generated in the process of converting the projection values $I_t$ into input values $s_t$.

The compensation data may be obtained in a separate calibration process (reference measurement), e.g. by placing a known object on the touch surface, and obtaining the projection values and computing the corresponding input values for the detection lines that are affected by the object. The calibration values for the affected detection lines may then be set to minimize the attenuation imbalance among the input values and yield compensated input values with a given expected attenuation. Depending on implementation, the calibration process may be able to produce compensation data for correcting both line imbalance and external imbalance.

Figure 13:
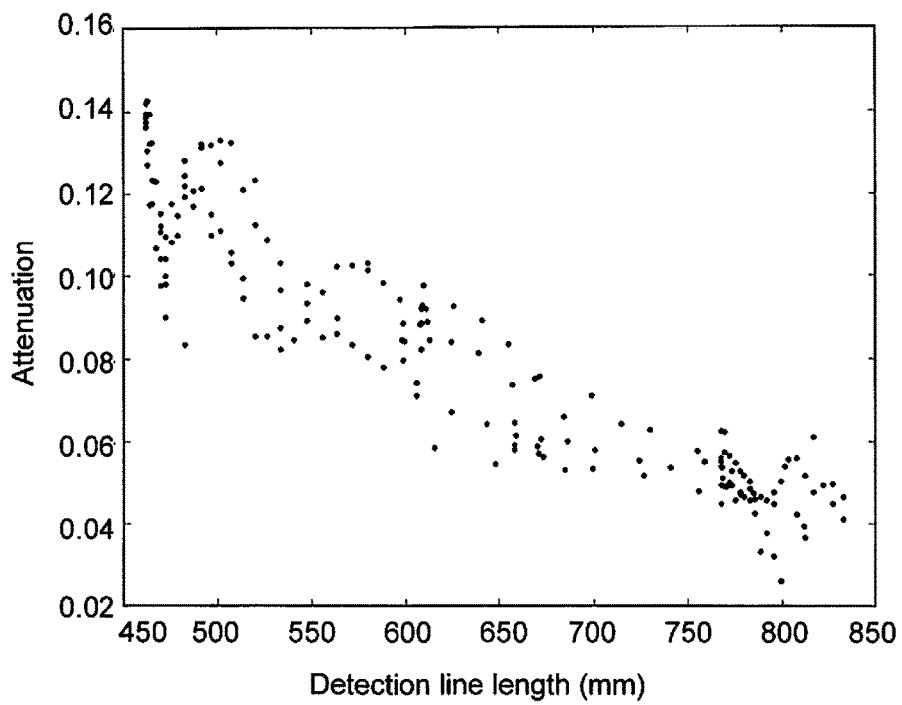
FIG. 13 is a graph of attenuation values for different detection line lengths obtained in a calibration process.

The result of a calibration process is shown in FIG. 13, which presents input values (attenuation values) as a function of the length of the detection lines. Each dot in FIG. 13 corresponds to a detection line and represents a time average over several frames. It is realized that compensation values may be calculated if the expected attenuation for each detection line is known.

In one implementation, one compensation value is calculated for each dot.

In another implementation, one compensation value is calculated for all detection lines of approximately the same length, e.g. by averaging the attenuation values of all detection lines that have a length within a specific interval.

In yet another implementation, a compensation function is adapted to the attenuation values in FIG. 13 and is used for generating the compensation values. The compensation function may be any function that counteracts (wholly or partly) the attenuation imbalance represented by the attenuation values obtained in the calibration process.

Below follows a specific example of how a compensation function $f$ may be used for generating the compensation values. In this example, the compensation function operates on transmission values $T_k$ and results in compensated transmission values $T_k^*$ according to:

$$T_k^* = f(T_k, dll_k) = T_k^{\sqrt{dll_k/\sigma}},$$

where $dll_k$ is the detection line length, and $\sigma$ is a constant that fits the compensation function $f$ to measured transmission values, e.g. corresponding to the data in FIG. 13.

If the input values $s_t$ are defined to represent attenuation according to $s_k = -\log(T_k)$, the compensation function may be applied directly on the input values to generate compensated input values:

$$s_k^* = -\log(T_k^*) = -\log(T_k) \cdot \sqrt{dll_k/\sigma} = s_k \cdot \sqrt{dll_k/\sigma}.$$

More generally, it has been found that the foregoing expressions $T_k^*$ and $s_k^*$ may be given as a function of $(dll_k)^\alpha$, where the exponent $\alpha$ is a fixed value given by $0.1 < \alpha < 0.9$, and preferably $0.3 \leq \alpha \leq 0.6$. The value of exponent for a particular FTIR system may be determined by fitting the compensation function to measured attenuation values.

It is realized that the compensated input values $s_k^*$ may be obtained by multiplying the input values $s_k$ by a respective constant, which may be pre-computed or computed on the fly based on the detection line length $dll_k$. It is also possible to estimate an individual compensation value $C_k$ for each detection line without explicitly factoring in the detection line length, i.e. $s_k^* = s_k \cdot C_k$.

As an alternative to the calibration process, the compensation data may be obtained by means of a simulation model for the FTIR system. The simulation model may be used for generating data corresponding to FIG. 13, or for directly estimating the compensation values $C_k$.

It should be noted that step 52 compensates all detection lines for attenuation imbalance even if only certain detection lines are actually affected by touching objects and thereby exhibits the attenuation imbalance. Such a compensation approach might introduce distortions in the reconstructed attenuation pattern. This can be avoided if the compensation in step 52 inherently changes only the input values of those detection lines that are affected by a touching object. This may be achieved by defining the compensation function to operate on transmission or attenuation values. In the examples given above, $T_k^* = T_k = 1$ and $s_k^* = s_k = 0$ for all detection lines that are essentially unaffected by touching objects.

The skilled person readily realizes that the first embodiment may be adapted to also compensate for the above-mentioned external imbalance.

Reverting to FIG. 12, step 54 processes the compensated input values to generate the attenuation pattern, and step 56 processes the attenuation pattern for detection of touch locations (and/or other touch data). The touch data may then be output for further processing, and the method returns to step 50. It is to be understood that one or more of the indicated steps may be effected concurrently. For example, the data collection step 50 of a subsequent frame may be initiated concurrently with any one of the steps 52-56.

Figure 14:
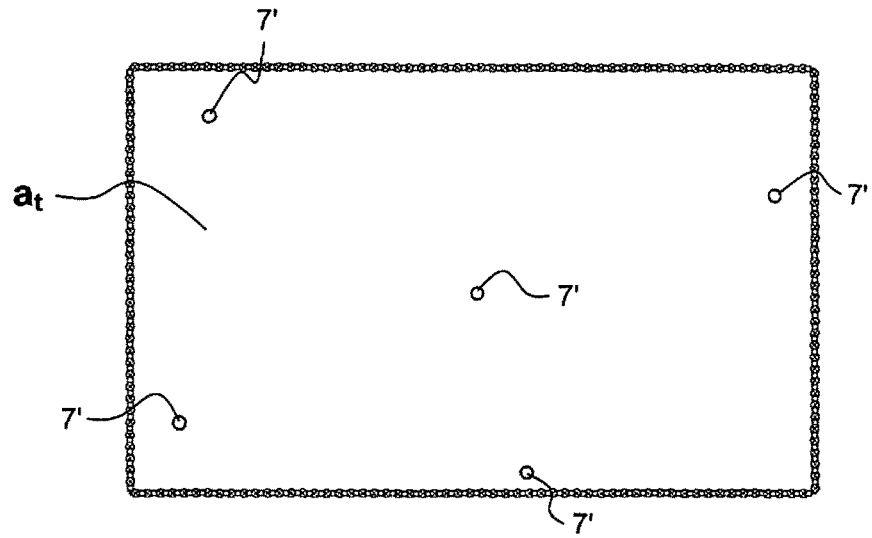
FIG. 14 is a 2D plot of an attenuation pattern after compensation.

FIG. 14 shows an attenuation pattern $a_t$ that has been reconstructed based on the same projection values as FIG. 4, but with compensated input values obtained according to step 52 of the first embodiment. As seen, the distortion of the touches 7' is essentially eliminated.

Figure 15:
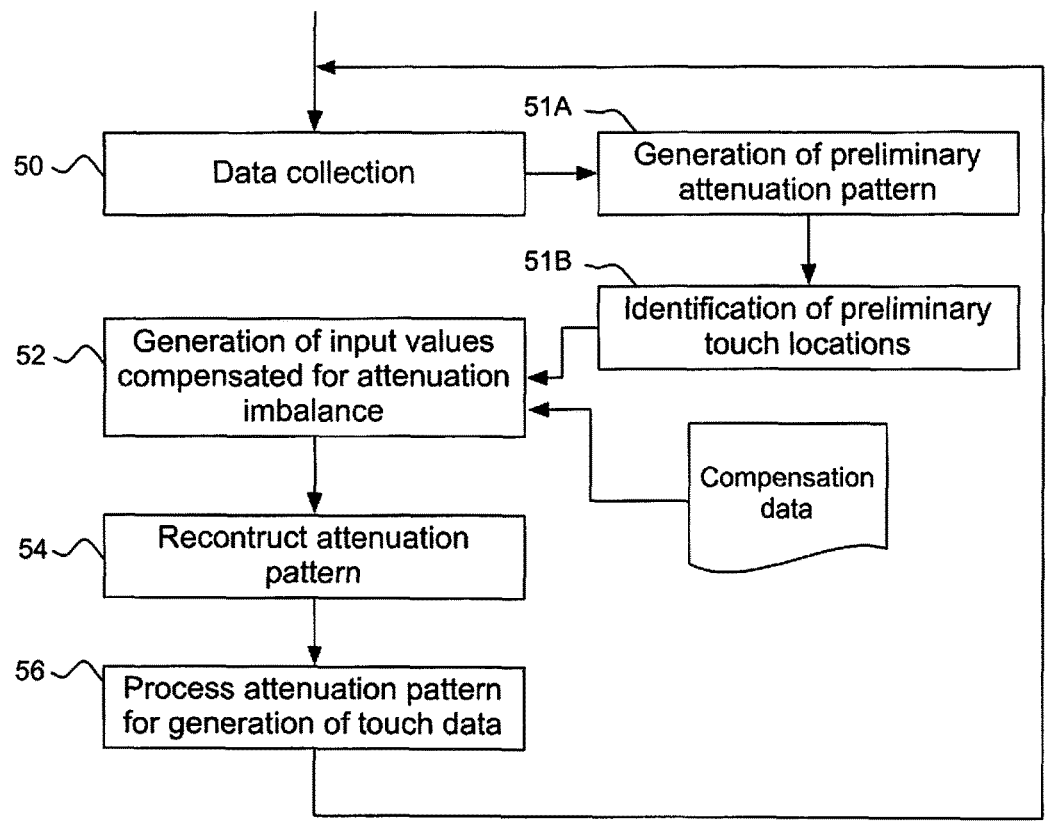
FIG. 15 is a flowchart of a compensation method according to a second embodiment.

FIG. 15 is a flowchart of a compensation method according to a second embodiment. Here, preliminary locations of objects deemed to exist on the touch surface in the current frame are identified and used for obtaining the compensation data. In a first variant, the preliminary locations may be used for identifying the detection lines that are affected by the touching objects. This may be used to selectively operate the compensation values only on the affected detection lines, e.g. if needed to avoid that unaffected detection lines otherwise are compensated for an attenuation imbalance that does not exist. In a second variant, the preliminary locations may be used for obtaining compensation data that compensates for variations in the relevant power profile along the detection line, e.g. to account for effects of light scattering in the FTIR system.

Steps 50, 54 and 56 are identical to the first embodiment. After step 50, step 51A processes the projection values to generate a preliminary attenuation pattern. Step 51A may be identical to step 54, i.e. it may operate a reconstruction function on input values obtained from the projection values. However, it is conceivable that step 51A uses a different reconstruction function and/or operates on a smaller number of input values and/or produces an attenuation pattern of lower spatial resolution than step 54. It is to be noted that the input values are not compensated for attenuation imbalance. Then, step 51B detects touches in the preliminary attenuation pattern and identifies preliminary touch locations, and possibly preliminary extents (size/area/shape), for the detected touches. In step 52, compensation data is obtained based on the preliminary touch locations, and compensated signal values are generated. In step 54, the compensated signal values are processed to reconstruct the attenuation pattern, which is processed in step 56.

In the above-mentioned first variant, step 52 may apply compensation values as in the first embodiment, while refraining from compensating any detection lines that are deemed unaffected by touching objects. Step 52 may, e.g., map the preliminary touch locations, optionally together with the preliminary extents, against a known grid of detection lines, so as to identify all affected detection lines (cf. FIG. 9).

In the above-mentioned second variant, step 52 may likewise map the preliminary touch locations against the grid of detection lines, so as to derive a position on each affected detection line. Step 52 may then apply a compensation function to suppress the influence of variations in the relevant power profile along the extent of the individual detection line. It is to be understood that the second variant may, and usually is, designed to compensate for other causes of attenuation imbalance as well. A combination of the first and second variants is conceivable.

In the first and second variants, it is also conceivable to include a compensation for the extent of the intersection between the detection line and the touching object. Differences in the intersection extent between detection lines extent may lead to an attenuation imbalance, since a larger intersection extent may result in a larger attenuation. This extent-dependent attenuation imbalance may be counteracted by applying compensation values obtained as a function of the interaction extent. The intersection extent for the respective detection line may be obtained by mapping the preliminary location and the preliminary extent of the touch to the detection lines. However, it may be noted that the extent-dependent attenuation imbalance may be an acceptable or even desirable property of the input values for certain reconstruction functions, such as tomographic reconstruction functions. In these cases, the compensation for variations in intersection extent may be omitted.

In an alternative embodiment (not shown), steps 51A-51B are omitted and step 52 instead uses touch locations determined for an attenuation pattern reconstructed by step 54 in a previous frame. Provided that the frame repetition rate is high compared to the movement of objects on the touch surface, the touch locations in the previous frame may be a useful estimate of the touch locations in the current frame. Alternatively, the estimate may be given by predicted touch locations which are obtained as a function of touch locations determined in the previous frames.

Figure 16:
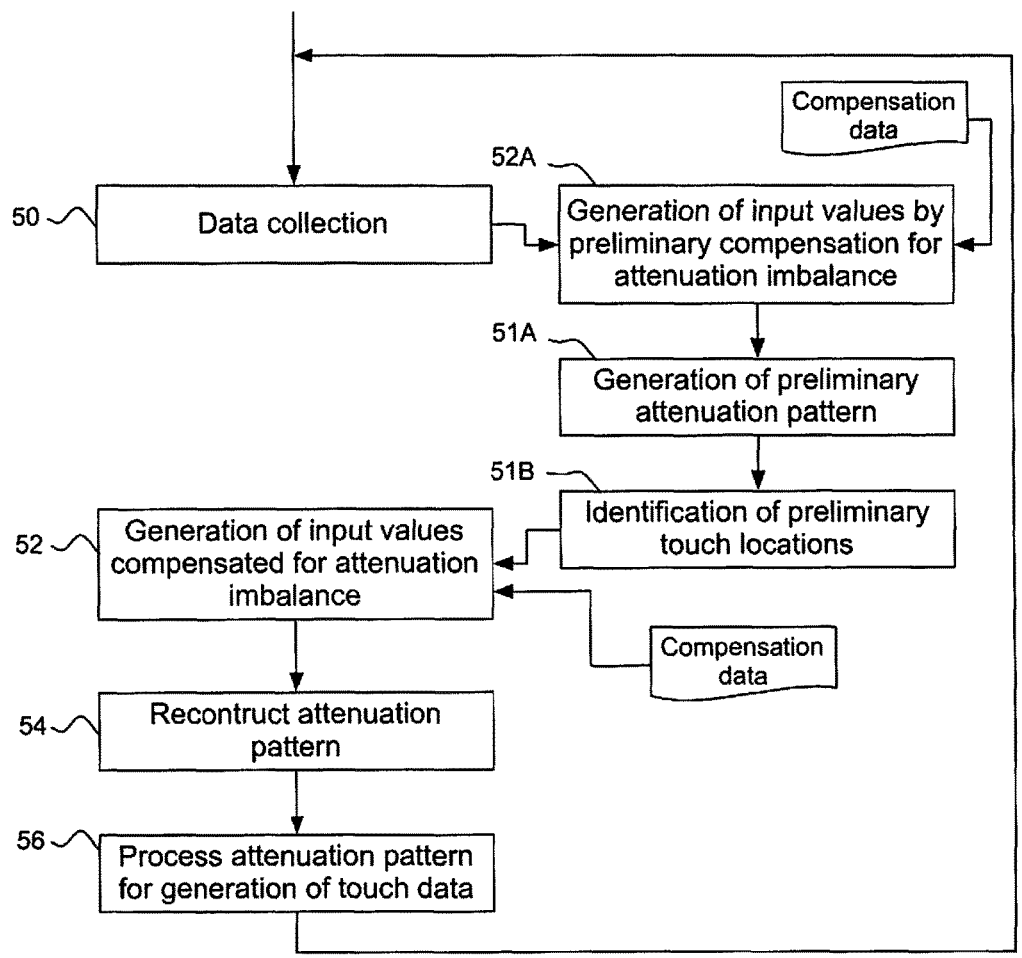
FIG. 16 is a flowchart of a compensation method according to a third embodiment.

FIG. 16 is a flowchart of a compensation method according to a third embodiment of the invention. The third embodiment differs from the second embodiment in that the preliminary attenuation pattern is reconstructed in step 51A based on pre-compensated input values, which are generated in a step 52A. The pre-compensation in step 52A may be implemented in the same way as step 52 in the first embodiment, i.e. to apply compensation values to all detection lines, irrespective of their interaction with touching objects. Thereby, step 52A may improve the accuracy of the preliminary touch locations (and preliminary touch extents) that are subsequently identified in step 51B and used in step 52.

Figure 17:
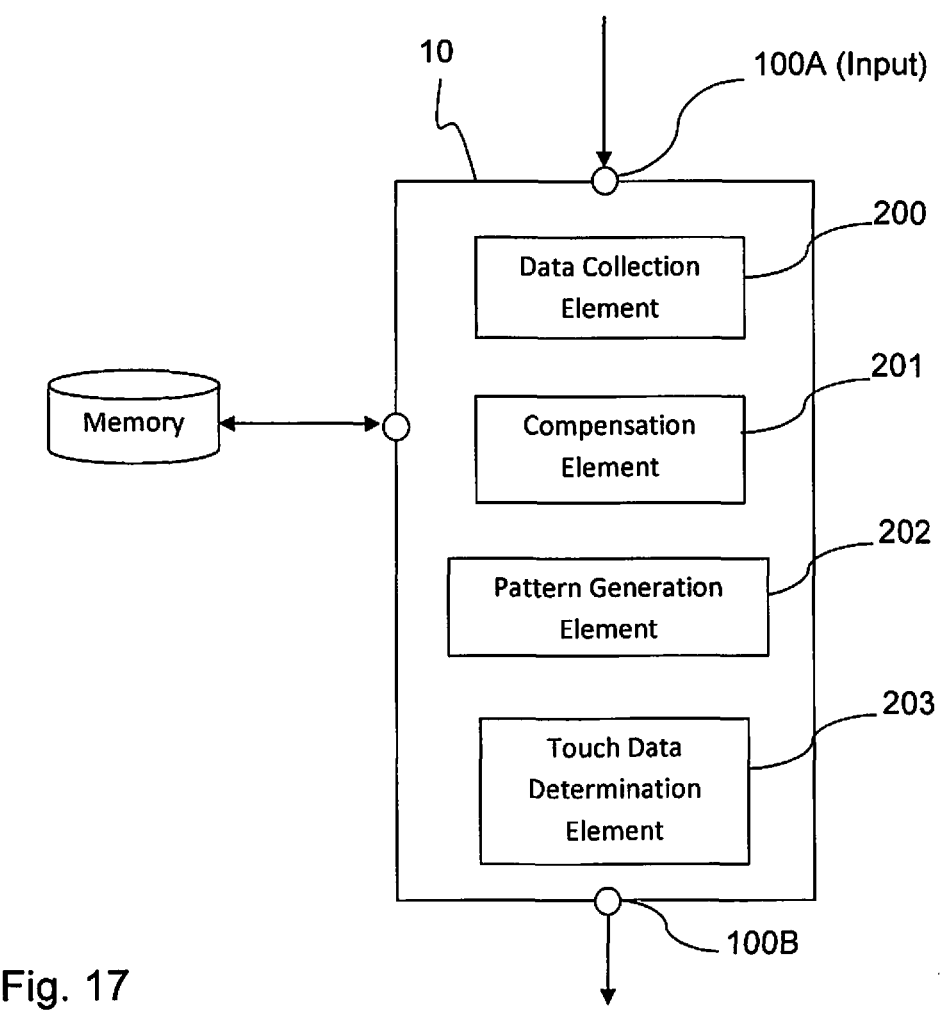
FIG. 17 is a block diagram of a device that implements the method in FIG. 12.

The compensation method according to the various embodiments disclosed herein may be implemented by a data processing device (cf. 10 in FIG. 1) which is connected to sample measurement values from the light sensors 3 in the FTIR system. FIG. 17 shows an example of such a data processing device 10, which implements the method of the first embodiment. The device 10 includes an input 100A for receiving the output signal, a data collection element (or means) 200 for obtaining the current projection values, a compensation element (or means) 201 for generating the current compensated input values based on the current projection values, and a pattern generation element (or means) 202 for generating a current attenuation pattern based on the current compensated input values, and a touch data determination element (or means) 203 for processing the current attenuation pattern for determination of current touch data, which is provided via an output 100B.

The device 10 may be implemented by special-purpose software (or firmware) run on one or more general-purpose or special-purpose computing devices. In this context, it is to be understood that each "element" or "means" of such a computing device refers to a conceptual equivalent of a method step, e.g. according to any of the first to third embodiments. There is not always a one-to-one correspondence between elements/means and particular pieces of hardware or software routines. One piece of hardware sometimes comprises different means/elements. For example, a processing unit may serve as one element/means when executing one instruction, but serve as another element/ means when executing another instruction. In addition, one element/means may be implemented by one instruction in some cases, but by a plurality of instructions in some other cases. Naturally, it is conceivable that one or more elements (means) are implemented entirely by analog hardware components.

The software controlled device 10 may include one or more processing units (cf. 14 in FIG. 1), e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software, the compensation data and any other data needed during execution, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an A/D converter. The special-purpose software may be provided to the device 10 on any suitable computer-readable medium, including a record medium, and a read-only memory.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

In certain embodiments of the invention, the compensation data may be pre-computed and retrieved from memory. This may save processing time as the computation is performed only once, e.g. at start-up or during a factory calibration, instead of once for each frame. However, in some touch systems the memory may be limited, e.g. if an FPGA is used for processing, and it may be advantageous to re-compute all or part of the compensation data for each frame.

All of the embodiments of the invention are equally applicable to generation of change values $ds_t$ that are compensated for attenuation imbalance and then processed for reconstruction of an attenuation pattern $da_t$.

Further, the format of the input values $s_t$ depends on (or is given by) the reconstruction function $\mathcal{P}'$ and the desired/required accuracy of the reconstructed pattern. In alternative implementations, the format may e.g. be given as a transmission (e.g. given by the projection value normalized by the reference value), an energy difference (e.g. given by the difference between the projection value and the reference value), or a logarithm of the energy difference. As used hereinabove, a "logarithm" is intended to also encompass functions approximating a true logarithmic function, in any base. Furthermore, the input values may have any sign, i.e. they may or may not be multiplied by a negative value. Depending on the reconstruction function, it may even be possible to use the projection values as input values. Similar modifications may be made with respect to the generation of the attenuation pattern $da_t$. Thus, on a more general level, the above-mentioned attenuation patterns $a_t$ and $da_t$ may be regarded as "interaction patterns" or "images" of changes in local interaction with propagating light caused by one or more touching objects.

As noted above, it may be possible to determine the touch data without reconstructing an interaction pattern, e.g. by identifying the detection lines that have interacted with an object and performing triangulation based on these detection lines. It is realized that a suppression of the attenuation imbalance may facilitate the identification and use of these detection lines.

The invention claimed is:

1. A method of processing an output signal from a touch-sensitive apparatus, the touch-sensitive apparatus including a light transmissive panel configured to propagate light by internal reflections from a plurality of incoupling points to a plurality of outcoupling points, thereby defining detection lines that extend across a surface portion of the panel between pairs of incoupling and outcoupling points, wherein each location on the surface portion is illuminated by incident light rays such that an object in contact with the surface portion interacts with the incident light rays of a subset of the detection lines, the touch-sensitive apparatus further including at least one light detector coupled to the outcoupling points to generate the output signal, wherein the method comprises:
obtaining, based on the output signal, signal values for the detection lines, the signal values being indicative of an apparent interaction between the object and light propagating on a respective detection line between a respective incoupling point and a respective outcoupling point; and
processing the signal values to generate touch data indicative of the object on the surface portion;
wherein said processing includes
generating compensated signal values by operating compensation values on the signal values to at least partly compensate for variations in the apparent interaction among the subset of the detection lines that interact with the object, wherein the compensation values are obtained to at least represent variations caused by differences in incident power distribution among the subset of the detection lines, the incident power distribution being a distribution of power among the incident light rays on the respective detection line with respect to a normal direction of the surface portion, and
processing the compensated signal values to generate said touch data;
wherein each of the compensation values is associated with one or more of the detection lines;
wherein a length of the respective detection line is a length from the respective incoupling point to the respective outcoupling point between which the respective detection line extends;
wherein the length of the respective detection line is in the plane of the surface portion; and
wherein each of the compensation values is given as a function of a length of the associated detection line and at least a first propagation angle in the plane of the surface portion between the associated detection line and a reference direction from the incoupling point corresponding to the associated detection line.

2. The method of claim 1, wherein the compensated signal values represent an equivalent apparent interaction between the object and the subset of the detection lines that interact with the object.

3. The method of claim 1, wherein
each of the compensation values is also given as a function of a second propagation angle in the plane of the surface portion between the associated detection line and a reference direction from the outcoupling point corresponding to the associated detection line.

4. The method of claim 1, wherein the compensation values are pre-computed.

5. The method of claim 1, wherein
the method is repeated at successive time points during operation of the touch-sensitive apparatus; and
the compensation values are re-computed at said successive time points.

6. The method of claim 1, wherein the compensation values are generated by one of a reference measurement and a mathematical simulation model.

7. The method of claim 1, wherein
each of the detection lines is associated with one of the compensation values; and
the compensation values are operated on the signal values by a function that causes the apparent interaction to be essentially unchanged for the detection lines that are free of interaction with the objects.

8. The method of claim 1, wherein
the signal values represent signal attenuation on the detection lines, the signal attenuation being zero in absence of interaction; and
the generating compensated signal values includes
multiplying the compensation values with the signal values of the detection lines, wherein
the compensation values are proportional to lengths of the associated detection lines in the plane of the surface portion raised by an exponent $\alpha$, wherein the exponent is given by $0.1<\alpha<0.9$.

9. The method of claim 1, further comprising:
obtaining said compensation values, the obtaining including
identifying a preliminary location of the object on the surface portion, and
obtaining said compensation values as a function of the preliminary location.

10. The method of claim 9, wherein the obtaining said compensation values further comprises:
identifying, based on the preliminary location, the subset of the detection lines that interact with the object; and
obtaining the compensation values for the subset of the detection lines.

11. The method of claim 9, wherein the compensation values are obtained specifically for the preliminary location.

12. The method of claim 9, wherein the identifying a preliminary location comprises:
obtaining input data based on the signal values; and
processing the input data to identify the preliminary location of the object.

13. The method of claim 12, wherein the input data comprises at least part of the signal values.

14. The method of claim 12, wherein
the obtaining input data includes
obtaining preliminary compensation data;
operating the preliminary compensation data on the signal values to generate pre-compensated signal values in which the variations in the apparent interaction are reduced; and the processing the input data to identify the preliminary location of the object includes
processing the pre-compensated signal values to identify the preliminary location.

15. The method of claim 9, wherein
the method is repeated at successive time points during operation of the touch-sensitive apparatus; and
the identifying a preliminary location includes retrieving a location of the object given by the touch data generated at a previous time point.

16. The method of claim 1, wherein the compensated signal values are generated to represent one of attenuation and transmission.

17. The method of claim 1, wherein processing the compensated signal values comprises:
operating an image reconstruction algorithm on the compensated signal values.

18. A non-transitory computer-readable storage medium comprising computer code that, when executed on a data-processing system, causes the data processing system to carry out the method of claim 1.

19. A device for processing an output signal from a touch-sensitive apparatus, the touch-sensitive apparatus including a light transmissive panel configured to propagate light by internal reflections from a plurality of incoupling points to a plurality of outcoupling points, thereby defining detection lines that extend across a surface portion of the panel between pairs of incoupling and outcoupling points, wherein each location on the surface portion is illuminated by incident light rays such that an object in contact with the surface portion interacts with the incident light rays of a subset of the detection lines, the touch-sensitive apparatus further including light detection means coupled to the plurality of outcoupling points to generate the output signal, said device comprising:
means for receiving the output signal;
means for obtaining, based on the output signal, signal values for the detection lines, the signal values being indicative of an apparent interaction between the object and light propagating on a respective detection line between a respective incoupling point and a respective outcoupling point; and
means for processing the signal values to generate touch data indicative of the object on the surface portion;
wherein said means for processing includes
means for generating compensated signal values by operating compensation values on the signal values to at least partly compensate for variations in the apparent interaction among the subset of the detection lines that interact with the object, wherein the compensation values are obtained to at least represent variations caused by differences in incident power distribution among the subset of the detection lines, the incident power distribution being a distribution of power among the incident light rays on the respective detection line with respect to a normal direction of the surface portion, and
means for processing the compensated signal values to generate said touch data;
wherein each of the compensation values is associated with one or more of the detection lines, and
wherein a length of the respective detection line is a length from the respective incoupling point to the respective outcoupling point between which the respective detection line extends;
wherein the length of the respective detection line is in the plane of the surface portion; and
wherein each of the compensation values is given as a function of a length of the associated detection line and at least a first propagation angle in the plane of the surface portion between the associated detection line and a reference direction from the incoupling point corresponding to the associated detection line.

20. A device for processing an output signal from a touch-sensitive apparatus, the touch-sensitive apparatus including a light transmissive panel configured to propagate light by internal reflections from a plurality of incoupling points to a plurality of outcoupling points, thereby defining detection lines that extend across a surface portion of the panel between pairs of incoupling and outcoupling points, wherein each location on the surface portion is illuminated by incident light rays such that an object in contact with the surface portion interacts with the incident light rays of a subset of the detection lines, the touch-sensitive apparatus further including a light detector coupled to the plurality of outcoupling points to generate the output signal, said device comprising:
a processor configured to execute computer readable instructions to
obtain, based on the output signal, signal values for the detection lines, the signal values being indicative of an apparent interaction between the object and light propagating on a respective detection line between a respective incoupling point and a respective outcoupling point,
generate compensated signal values by operating compensation values on the signal values to at least partly compensate for variations in the apparent interaction among the subset of the detection lines that interact with the object, wherein the compensation values are obtained to at least represent variations caused by differences in incident power distribution among the subset of the detection lines, the incident power distribution being a distribution of power among the incident light rays on the respective detection line with respect to a normal direction of the surface portion, and
process the compensated signal values to generate touch data indicative of the object on the surface portion;
wherein each of the compensation values is associated with one or more of the detection lines;
wherein a length of the respective detection line is a length from the respective incoupling point to the respective outcoupling point between which the respective detection line extends;
wherein the length of the respective detection line is in the plane of the surface portion; and
wherein each of the compensation values is given as a function of a length of the associated detection line and at least a first propagation angle in the plane of the surface portion between the associated detection line and a reference direction from the incoupling point corresponding to the associated detection line.

* * * * *